United States Patent [19]

Deley

[11] Patent Number: 4,587,875
[45] Date of Patent: May 13, 1986

[54] PORTABLE SAWING DEVICE UTILIZING A CIRCULAR POWER SAW

[76] Inventor: Theodore Deley, 2039 Austin Ave., Coquitlam, British Columbia, Canada, V3K 3R5

[21] Appl. No.: 729,746

[22] Filed: May 2, 1985

[51] Int. Cl.$^4$ .............................................. B27B 5/20
[52] U.S. Cl. .................................... 83/471.3; 83/473; 83/486.1; 83/522; 83/574; 83/582
[58] Field of Search .............. 83/574, 522, 582, 471.3, 83/473, 486, 486.1

[56] References Cited

U.S. PATENT DOCUMENTS

| | | | |
|---|---|---|---|
| 1,646,589 | 10/1927 | Meek et al. | 83/574 X |
| 2,559,283 | 7/1951 | Dick, Jr. | 83/473 |
| 2,602,474 | 7/1952 | Truchan | 83/574 X |
| 3,680,609 | 8/1972 | Menge | 83/471.3 X |
| 4,163,404 | 8/1979 | Lavis | 83/574 X |
| 4,328,728 | 5/1982 | Ferdinand et al. | 83/471.3 |

Primary Examiner—Frank T. Yost

[57] ABSTRACT

A portable sawing device having a frame attachable by clamping means against the underside of a workpiece support bench. A portable circular power saw is supported on and engaged by an adapter plate hinged to a bearing plate at the forward part of a supporting arm. The adapter plate with the saw is movable about the horizontal hinge axis, between a lowered cutting position and a raised, tilted-up, non-cutting position, and is spring biased upwardly. The supporting arm comprises two concentric telescoped cylinders: the inner, bearing the saw, is rotatable within the outer and lockable thereto for bevel cutting; the outer is cantilevered forwardly from a support column vertically disposed behind the bench. The column is carried by a horizontal cross member secured between the ends of two parallel rods horizontally and forwardly disposed beneath the frame and slidably mounted in sleeves which are secured to a plate rotatably and lockably attached to the frame. The saw and arm reciprocate as a unit and the arm may be rotated about a vertical axis and locked to align the saw along desired cutting angles. The adapter plate and saw may be rotated with the attached bearing plate about a vertical axis to a rip cutting position perpendicular to the saw supporting arm and by means provided restrained in the lowered cutting position.

10 Claims, 7 Drawing Figures

PORTABLE SAWING DEVICE UTILIZING A CIRCULAR POWER SAW

This invention relates to a portable sawing device adapted to be detachably fastened to a workpiece support bench and to utilize a portable circular power saw which is supported at the forward part of a horizontal arm and is mutually reciprocated with the arm to traverse a workpiece positioned on the bench and effect a cut.

BACKGROUND OF THE INVENTION

Although a variety of devices are available for executing lateral and longitudinal cuts on workpieces (some of which utilize portable power saws) generally such devices have a frame or base attached to a support stand having a plurality of supporting legs. A small, essentially rectangular platform is afixed to the frame or base defining a workpiece support surface. An arm or saw guide is usually secured by a support means to the frame and is disposed over the workpiece support surface. While the saw is usually slidable along the arm or saw guide, it is, generally, in some way permanently attached to it and forms an integral part of the device. This combination of components makes such devices bulky, heavy, difficult to move and awkward to transport. Furthermore, the relatively small workpiece support platforms of such devices do not conveniently lend themselves to extension. It is desirable, however, when cutting an elongated workpiece, to have an extended surface supporting such a workpiece over its entire length to prevent it from jackknifing and to keep the ends from falling when cut. Such an extended workpiece support surface, by means of markings on it, may also serve as a gauge to quickly measure the desired lengths to be cut. Moreover, once the workpiece support platform of such a prior art device is extended, the device is then more or less attached to the extension and is inconvenient to move.

In addition, it is a known characteristic of such a commonly used sawing device as the standard fixed arm radial arm saw, that a cut is executed with it by drawing the saw forwardly across the workpiece. Because of the direction of the saw blade rotation, the saw has the objectionable tendency to feed itself, climb the workpiece and jamb, thus stalling the motor, so that considerable care and effort must be exercised when executing a cut. Additional care must be taken, upon completion of a cut, to return the saw along the kerf to its rearward position to permit the safe removal, replacement and positioning of the workpiece. The fixed arm, however, remains over the workpiece support surface more or less in the way of the operator.

The objects of the present invention are, therefore, to provide a sawing device which is of light weight and easily portable and which is convenient to set up and use in conjunction with a simply constructed, extended workpiece support bench; a device which utilizes a conventional portable circular power saw which may be easily mounted on, and removed from it, thus reducing the weight of the device for portability and also eliminating duplication by permitting the use of the same saw for other purposes; a sawing device in which the saw may be mutually reciprocated with the support arm and also be pivotably attached to it so that the saw may be drawn forwardly above the workpiece, then plunged down and pushed rearwardly into the cut, thereby eliminating self-feeding. It may then be tilted upwardly out of the way to clear the work area for removal, placement and positioning of the workpiece.

It is, of course, desirable to provide on such a sawing device means for automatically retracting the saw blade guard as the saw is lowered into a cut and for permitting the guard to return around the saw blade as the saw is tilted upwardly.

It is also an object of the present invention to provide a sawing device, with the aforementioned features, which is sufficiently versatile to perform all desirable cuts, uncomplicated to manufacture and use, sturdily constructed, durable, yet sufficiently compact to be convenient to transport.

SUMMARY OF THE INVENTION

The apparatus of a preferred embodiment of the present invention is adapted to function in conjunction with an extended workpiece support bench, constructed of wood, defining a workpiece support surface. Such a bench may be of any desirable length necessary to accommodate the workpiece and may be supported by any suitable means, as by a plurality of legs or as by sawhorses at each end. It should have a reasonably broad horizontal surface to provide an adequate work area and a flange, extending along the rearward edge and projecting above the top surface, defining a workpiece abutting fence.

The apparatus includes a frame comprising an extended flange member L-shaped in section and secured across the broader part of the face of an oblong tapered plate member at a right angle to its longitudinal axis---forming a T-shape. Clamping means are provided at the extremities of the frame for detachably fastening it against the underside of the workpiece support bench. The extended flange member aligns with the lower rearward edge of the bench, with the L-shape conforming to the surfaces, and the tapered part of the plate member extends forwardly and flatly against the underside of the bench. The clamping means at the ends of the extended flange member extend upwardly and forwardly so that the tightening screws bear on the top edge of the fence. The forwardly extending part of the tapered frame plate member has an extendable section attached to it with an upwardly turned part threadably receiving a horizontal tightening screw bearing against the forward edge of the bench. By these means the apparatus of this invention may be easily and quickly attached to, and removed from, the support bench.

The apparatus is adapted to utilize a conventional portable circular power saw which is mounted on and engaged by an adapter plate designed to conform to the saw base or planar shoe and hold it securely in place. The saw is locked in position by its own weight and may be removed only by tilting it upwardly about the toe of the planar shoe and lifting it off. Holes in the adapter plate are provided for securing the saw by means of screws when desirable.

The adapter plate is hinged to a rotatable bearing plate which is lockably attached by a pivot bolt beneath a fixed bearing plate which is secured to the underside of the forward part of a horizontal support arm forwardly disposed above the workpiece support bench. The saw with the adapter plate is thus pivotably movable about the horizontal hinge axis between a lowered, horizontal, cutting position generally spaced from and parallel to the workpiece support surface and a raised, non-cutting, tilted-up position. By means of a tension spring acting on a lever attached to the adapter plate, the plate and saw are yieldingly urged upwardly and maintained in the tilted-up position unless forced down for the execution of a cut.

In order to leave the workpiece support surface unobstructed the saw and support arm of this invention reciprocate as a unit. This necessitates a comparatively frictionless supporting of the arm and the need to eliminate the tendency of the arm to sag and bind under the overhanging weight of the saw. In addition, the mounting means must be such as to prevent twisting, sidesway, and chattering of the arm as it is reciprocated. This is accomplished in this invention by a novel carriage arrangement wherein the sliding components are located beneath the frame and workpiece support bench. These components comprise two horizontal, parallel, spaced apart, extended rods slidably mounted in sleeves secured to a horizontal mounting plate, rotatably and lockably attached by a vertical pivot bolt and lock nut, to the frame underside. Front and rear cross members are rigidly secured to the ends of the rods and the saw supporting arm is cantilevered forwardly from the top of a vertical support column which extends upwardly from the rear cross member. By this arrangement the weight of the saw is more or less balanced over the sliding rods thus eliminating the binding and chattering normally caused by the torgue of a laterally disposed weight. The support arm carriage may be rotated about the vertical axis of the pivot bolt and locked in place to align the arm and saw along desired cutting angles to the longitudinal axis of the workpiece support bench.

The saw supporting arm comprises two concentric, telescoped cylinders. The inner cylinder is rotatable within the outer cylinder, extends forwardly beyond it and has the saw supporting means attached to it. The rearward end of the outer cylinder is secured to the support column and the forward end terminates in a split collar bearing with a tightening screw for releasably securing the inner cylinder from rotation. By this means, the hinge axis, adapter plate, and saw may be rotated about the horizontal central axis of the support arm and locked at desired bevel cutting angles.

The adapter plate and saw may be turned in conjunction with the rotatable bearing plate to a rip cutting position perpendicular to the supporting arm and restrained in the lowered cutting position by a flange on an ear projecting horizontally from the fixed bearing plate.

The foregoing features and other advantages will readily become apparent as the preferred embodiment of this invention is, hereinafter, more fully described in detail, illustrated in the accompanying drawings and finally pointed out in the appended claims.

In the claims, we well as in the description, parts are, at times, identified by specific names for clarity and convenience, but such nomenclature is to be understood as having the broadest meaning consistent with the context and concept of this invention. For ease of description and understanding, the apparatus of this invention will be referred to in the normal operating position in such terms as upper, lower, horizontal, vertical, forward and rearward. It is to be understood, however, that these are relative terms and that the apparatus of this invention may be manufactured, transported, stored, sold, and used in an orientation other than the normal operating position. The precise shapes and sizes of the components herein described are not essential to this invention unless otherwise stated.

BRIEF DESCRIPTION OF THE DRAWINGS

In the accompanying drawings, illustrating the preferred embodiment of this invention, like characters designate corresponding like parts in all views.

DESCRIPTION OF THE PREFERRED EMBODIMENT

Figure 1:
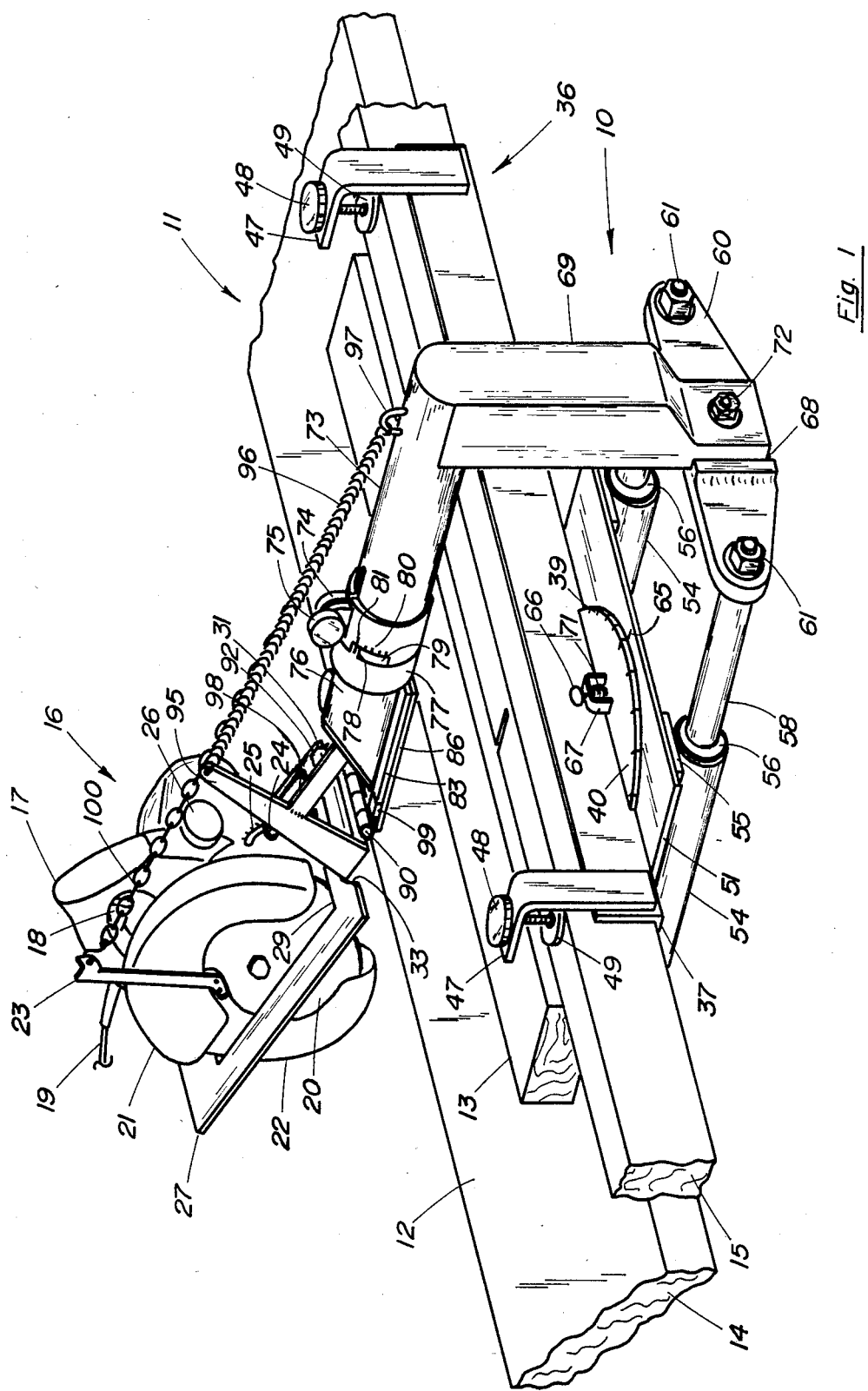
FIG. 1 is a perspective front-side view of the apparatus of the present invention, attached to a suitable workpiece support bench, with a portable circular power saw mounted thereon in a non-cutting position.

As illustrated in the drawings, FIGS. 1 to 5, the apparatus of this invention, designated generally by the numeral 10, is designed to be attached to, and function in conjunction with, a suitable workpiece support bench constructed of wood, designated generally by the numeral 11, providing a workpiece support surface 12 upon which a workpiece 13 may be positioned. Such a bench should have a reasonably broad horizontal section 14, with a narrower section forming a workpiece abutting or rip fence 15 secured to it, as by nails, along the rearward edge flush with the bottom surface and projecting slightly above the top surface 12. The bench 11 may be of any desirable length necessary to accommodate the workpiece and may be supported by any suitable means as by a plurality of legs or sawhorses at each end (not shown).

Figure 7:
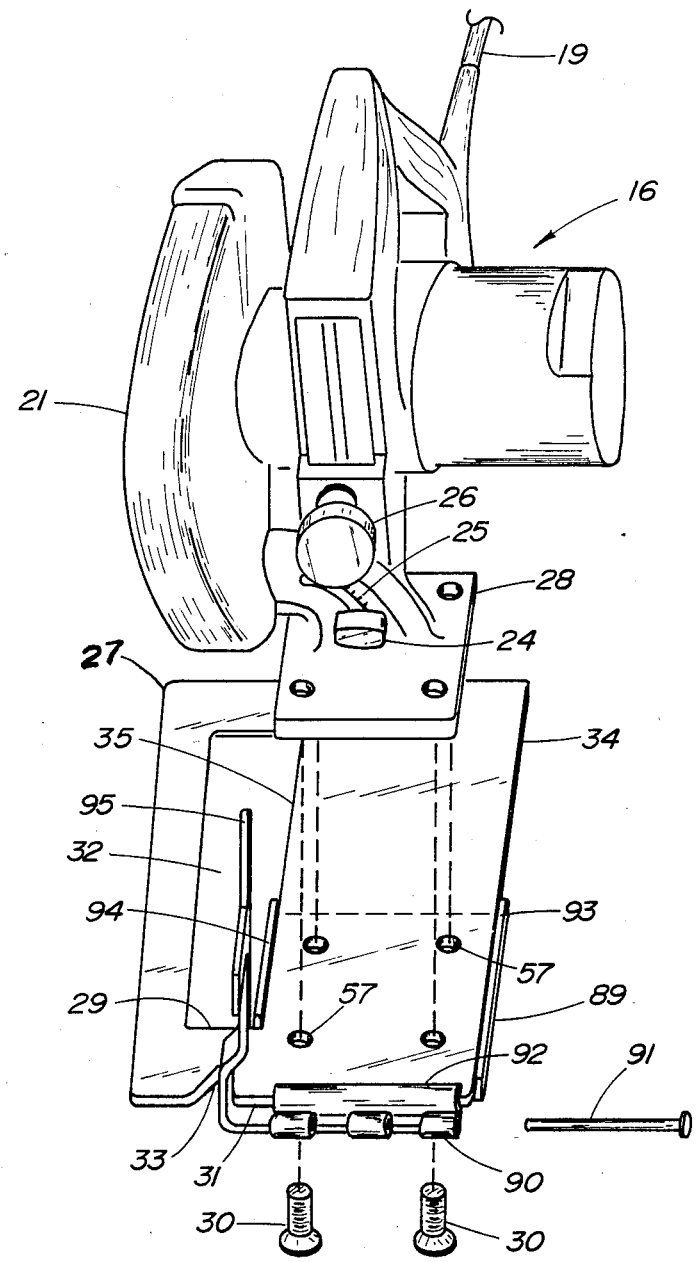
FIG. 7 is an enlarged perspective view of the saw adapter plate of the embodiment of this invention, and of a typical portable circular saw assembly utilized by this invention, illustrating the engagement of the saw planar shoe and the alignment of the mounting screw holes.

The apparatus of this invention is adapted to accommodate and utilize most types of conventional portable circular power saws that are commercially available in the United States and Canada. One such type of saw is designated generally by the numeral 16 in FIGS. 1,2,3,4 & 7. Typically such saws are an assembly comprised of, in part, a handle 17, a trigger switch 18, a power supply cord 19, a circular saw blade 20, a fixed upper saw blade guard 21, a spring biased, movable, lower saw blade guard 22, a lower saw blade guard operating lever 23, a bevel cutting angle adjustment knob 24, a bevel angle guage 25, a cutting depth adjustment knob 26, a base plate or planar shoe 27, a planar shoe mounting bracket 28 (FIG. 7), and planar shoe mounting screws 30 (FIG. 7). The planar shoe 27, as shown in FIG. 7, generally has a slightly turned up toe 31, a saw blade slot 32, and a cutting guide notch 33.

Figure 2:
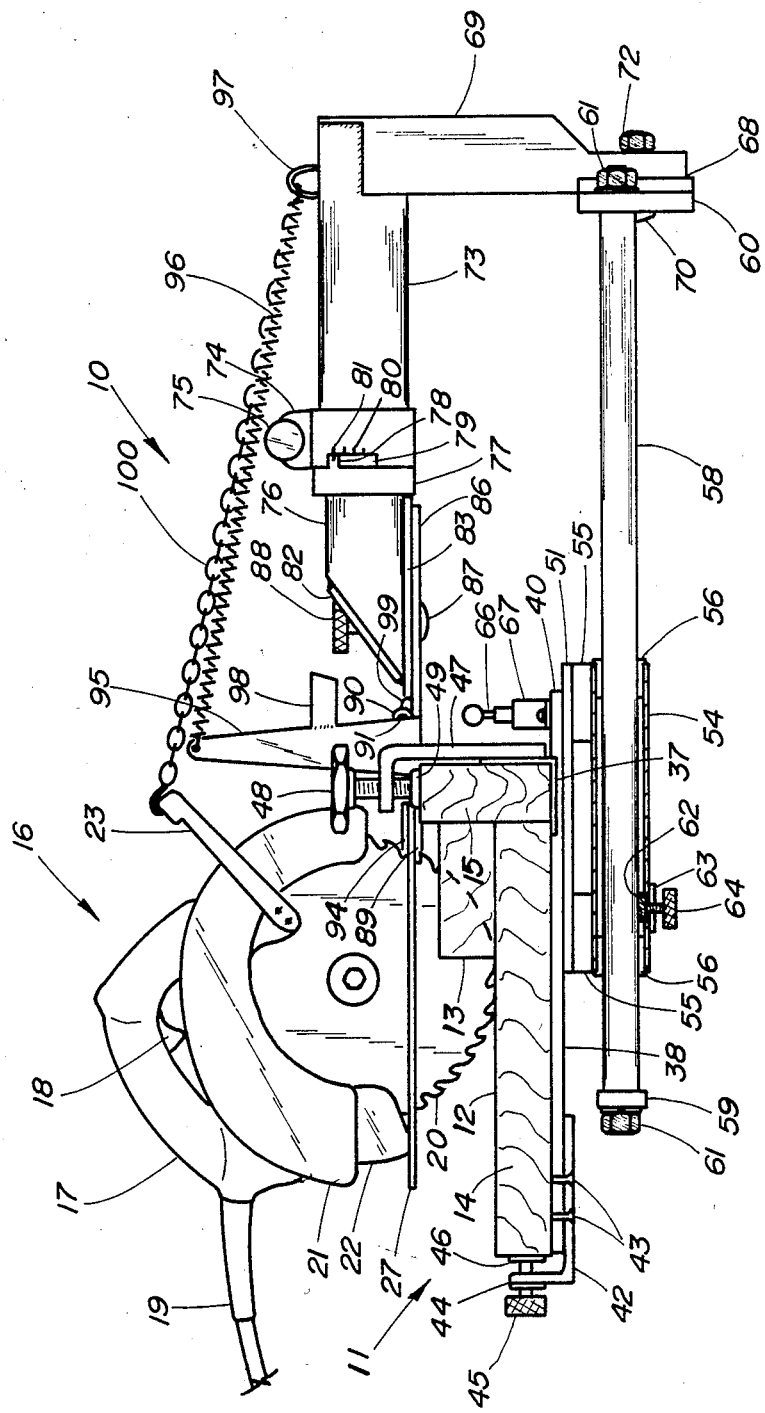
FIG. 2 is a side elevation, partly in section, of the apparatus illustrated in FIG. 1, but showing the saw in a forward and fully lowered position cutting a workpiece on the bench.
Figure 5:
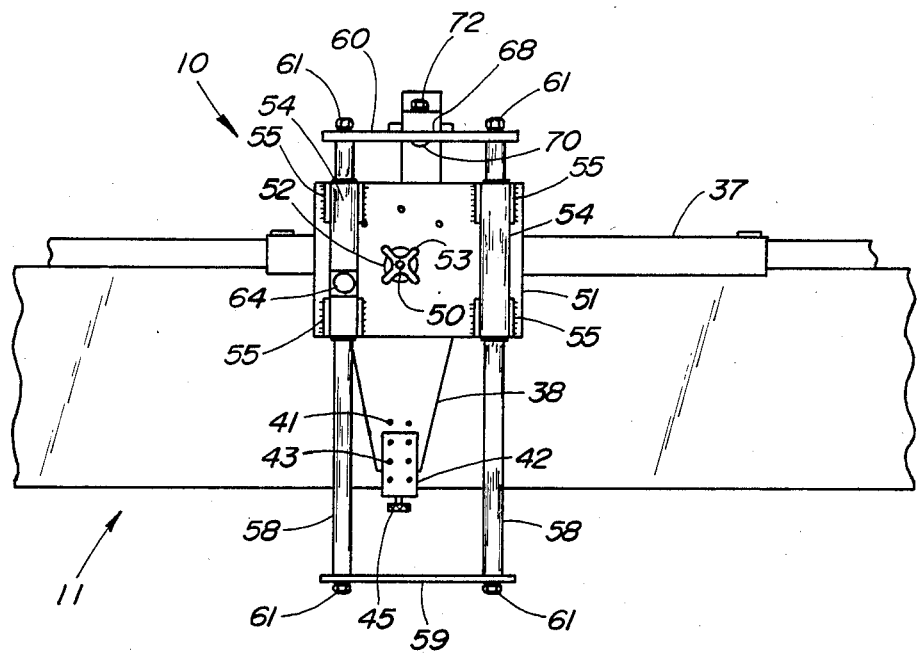
FIG. 5 is a bottom view of the apparatus shown in FIG. 2.
Figure 6:
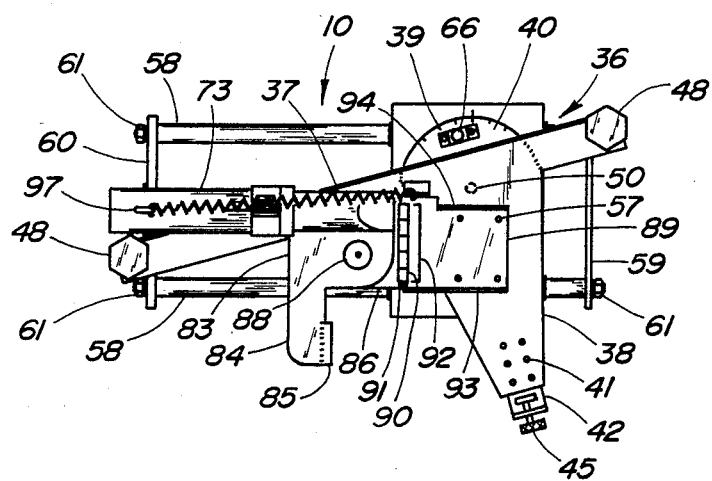
FIG. 6 shows the apparatus of this invention removed from the workpiece support bench, with the saw removed, and the apparatus folded for carrying or storage.

As best illustrated in FIG. 6, the apparatus 10 includes an essentially T-shaped frame, designated generally by the numeral 36, horizontally disposed and comprised of an extended flange 37, corresponding to the top of the T-shape and secured, as by welding, across the broad face of an oblong tapered frame plate 38. The forwardly extending tapered part of plate 38 corresponds to the stem of the T-shape, so that the longitudinal axis of plate 38 is perpendicular to the longitudinal axis of the flange 37. The horizontal flange 37 is L-shaped in section and one edge is upwardly disposed, and the other, which is forwardly disposed, is cut out to conform to the shape of plate 38 so as to form a flush joint of the two surfaces. An arcuately shaped portion of the broad face of plate 38, which extends rearwardly beyond the flange 37 and has angle indicia 39 along the arcuate edge, forms the protractor plate 40. The narrow forward end of frame plate 38 has a plurality of symmetrically spaced, threaded, screw holes 41, corresponding to equally symmetrically spaced holes in an extension plate 42 secured to it by screws 43 (FIGS. 2 & 5). The forward end of extension plate 42 has a thickened upwardly turned part 44, in which is threadably received a horizontal tightening screw and knob 45 with a swivel base 46, knurled on the rearward face, for securing this part of the frame 36 to the forward edge of the bench section 14, as will be hereinafter described. The ends of the flange 37 have secured thereto, as by welding, upwardly disposed brackets with the upper ends thickened and turned forwardly forming C-clamps 47 (FIG. 1). Vertical tightening screws and knobs 48, with swivel bases 49, are threadably received in the forwardly turned sections of clamps 47.

By the novel design of frame 36 thus far described, the frame 36 may be attached to the workpiece support bench 11 by passing the frame plate 38 forwardly beneath bench 11 and hooking clamps 47 on the fence 15 so that the swivel bases 49 bear on the top edge of the fence 15, and the flange 37 aligns longitudinally with the bottom rearward edge of the fence 15 and conforms thereto. The forward end of extension plate 42 is then brought upwardly so that the swivel base 46 bears against the forward edge of bench section 14 as the screw and knob 45 is tightened and the frame plate 38 is held flatly against the bottom of the bench 11. Screws 48 on clamps 47 may then be tightened and screw 45 may be further tightened to set the frame 36 in close contact and conformity with the underside and the rearward edge of the bench 11. Extension plate 42 may be adjusted for various widths of bench section 14 by selecting the appropriate screw holes 41 provided for attaching it to the frame plate 38. The frame 36 may be detached from the bench 11 by reversing the above procedure.

The description henceforth will be based on the understanding that the frame 36 is secured to the bench 11 and that the work support surface 12 is horizontally disposed.

Projecting downwardly from, and secured by welding to, the underside of frame plate 38 is a vertical pivot bolt 50, at a location such that its vertical axis coincides with the intersection point of the longitudinal axis of plate 38 and the joint line of bench sections 14 and 15. (FIG. 6)

Rotatably mounted on pivot bolt 50, flatly disposed against the underside of plate 38 and extending slightly beyond the rearward edge of plate 40, is a rectangular plate 51, lockable in fixed relation to plate 38 be means of a washer 52 and lock nut 53 threaded on pivot bolt 50 (FIG. 5).

Two parallel tubular sleeves 54 are secured by welding to mounting bases 55 which are, in turn, secured as by welding to the underside of rectangular plate 51, along its opposite parallel edges (FIGS. 1 and 5). The open ends of tubular sleeves 54 are fitted with friction reducing bushings 56, and slidably mounted therethrough are two extended, equal length, round, parallel rods 58. The ends of the rods 58 have a reduced diameter and are spanned by two equal length, parallel, transversely extending cross members, a forward cross member 59 and a rear cross member 60. The ends of rods 58 are snugly fitted into holes provided at the ends of the cross members 59 and 60 and are rigidly secured thereto by lock nuts 61 threaded on the rod ends, thus maintaining the parallelism of the rods and cross members. The rods 58 being considerably longer than the mounting sleeves 54 are thus slidable within the bushings 56, forwardly and rearwardly, within the limits of the cross members.

It is desirable to be able to releasably lock the rods 58 against slidability, for reasons to be pointed out further on in this description. To this end, a rectangular aperture is provided in the side wall of sleeve 54 within which is fitted a rectangular semi-circular braking block 62 (FIG. 2). The inner face of block 62 is curved to conform to the rod 58 and the outer face to conform to the outer curvature of the sleeve 54. A rectangular semi-circular cover plate 63 is welded over the aperture. A set screw 64, with a finger knob, is threadably received in cover plate 63, perpendicularly to the longitudinal axis of the rod 58 and bears on braking block 62, which in turn, upon the tightening of the screw 64, bears against the rod 58, thus securing it from reciprocatory movement relative to the sleeve 54 (FIG. 2).

The rods 58, in conjunction with plate 51, may be rotated in a horizontal plane about the vertical axis of pivot bolt 50 and locked by means of lock nut 53 at selected angles to the longitudinal axis of the bench 11. It is, of course, desirable that this angular adjustment be known, and for this purpose the rearward edge of arcuate plate 40 is the arc of a circle having its center at the vertical axis of pivot bolt 50. The 90 degree mark of the angle indicia 39 is located on the longitudinal axis of frame plate 38. An indented line, provided on plate 51, serves as an angle indicator 65. When the longitudinal axes of the rods 58 are parallel to the longitudinal axis of frame plate 38 and thus at a 90 degree angle to the longitudinal axes of the fence 15 and the workpiece 13 thereagainst, the indented line indicator 65 aligns with the 90 degree mark of the indicia 39 on plate 40 (FIG. 1). For quickly locating this position, a tapered aperture (not visible) is provided through plates 40 and 51 receiving a tapered locating pin 66, biased downwardly by spring 71 and slidably journalled in, and held vertical by, bracket 67. as shown in FIG. 1. Tapered apertures (not visible) are also provided in plate 51 for engaging locating pin 66 at 45 degree positions both sides of center.

For ease of further description, the rods 58 will be considered as being temporarily locked in a position such that their longitudinal axes form a 90 degree angle with the longitudinal axes of the bench 11 and workpiece 13.

The rear cross member 60 has a vertical channel 68, at proximately the mid-point of the rearward face, slidably and snugly receiving the flattened lower end of a vertical support column 69. A carriage bolt 70 passes through an elongated vertical slot (not visible) in the middle of channel 68 and through a corresponding bore in the flattened part of column 69. The column 69 may thus be adjusted upwardly or downwardly within the limits of the elongated slot and locked rigidly to cross member 60 by a lock nut 72 threaded on carriage bolt 70 (FIG. 2).

Secured, as by welding, to the upper end of support column 69 and cantilevered forwardly over bench 11, is a cylindrical arm 73, having its rearward end closed by column 69 and its forward terminating in a collar bearing 74, longitudinally split at the top and provided with a horizontal clamping screw and knob 75 (FIGS. 1 and 2). A second concentric inner cylinder 76 is snugly telescoped into the full length of arm 73, extends forwardly beyond it, and is rotatable therein, a predetermined amount, about their common central longitudinal axis which is, by design, parallel to the longitudinal axes of the rods 58.

The inner cylinder 76 is limited in amount of rotation by means of a collar 77, secured to it as by welding, abutting the collar bearing 74 and having a square projection 78 in its rim extending rearwardly into a cut-out section 79 in the collar bearing 74. The cut-out section 79 extends clockwise (viewed rearwardly) an amount necessary to limit the maximum rotation of inner cylinder 76 to 45 degrees. The inner cylinder 76 may be locked in fixed relation to the cylindrical arm 73 by means of tightening screw 75 on split collar bearing 74. Angle graduations 80 are provided on the rearward edge of cut-out 79 on collar 74. The line 81 on projection 78 serves as an angle indicator (FIGS. 1 and 2).

For further description, the inner cylinder 76 will be considered as being turned fully in the counter-clockwise direction so that the projection 78 abuts on the upper end of the cut-out 79.

The forward end of the inner cylinder 76 is closed by a diagonal cover plate 82 welded thereto. A fixed bearing plate 83, having a rounded corner and a projecting ear 84, is secured, as by welding, in a horizontally disposed position, to the underside of the forward end of inner cylinder 76. The projecting ear 84 has its forward edge perpendicular to the longitudinal axis of arm 73 and a flange 85 welded to its upper surface along the forward edge, at the distal end, and projecting slightly forwardly over the edge (FIGS. 3, 4 and 6).

Figure 3:
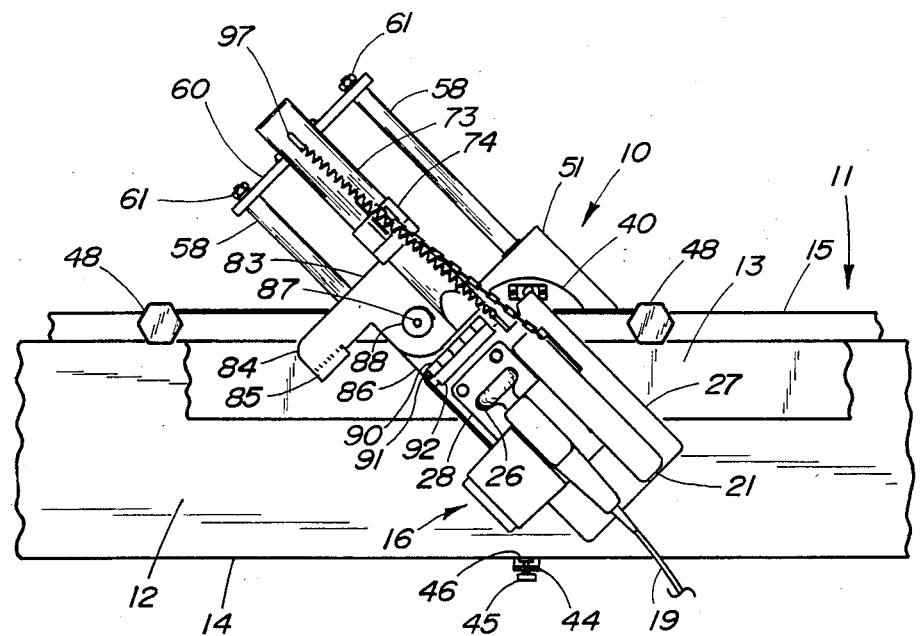
FIG. 3 is a top plan view of the apparatus shown in FIG. 2, but with the apparatus set in an angle cutting position.
Figure 4:
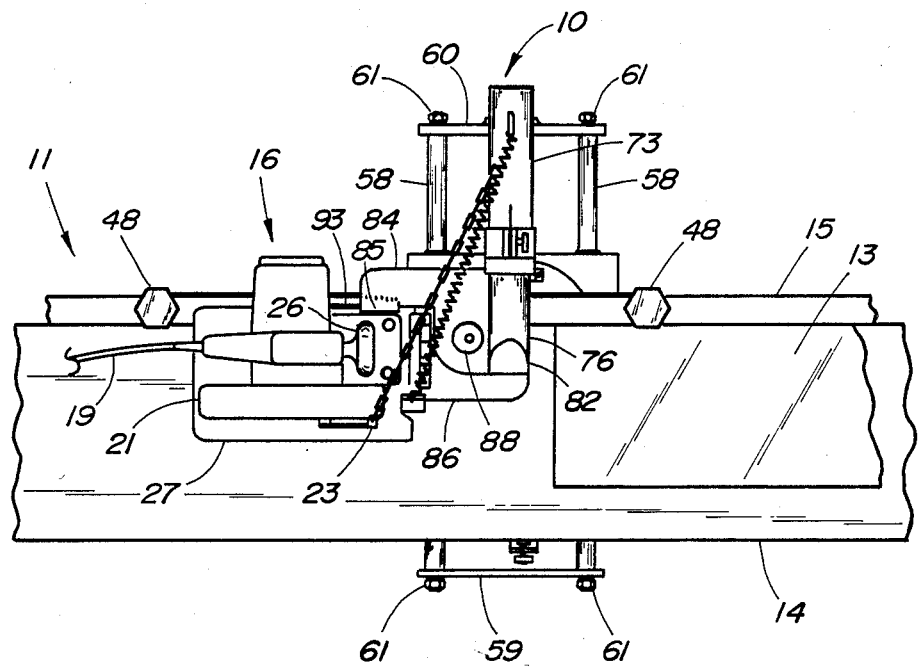
FIG. 4 is a view similar to FIG. 3, but with the apparatus set for rip cutting with the saw turned through 90 degrees and locked in a horizontal position.

A rectangular companion bearing plate 86 is rotatably attached against the underface of plate 83 by means of a carriage bolt pivot 87 (FIG. 2) and may be locked in fixed relation to plate 83 by a lock knob 88 threaded on pivot bolt 87 (FIGS. 3 and 4).

For ease of further description, plate 86 will be considered as being locked in a position such that a side edge is parallel to the longitudinal axis of the cylindrical arm 73 and thus the forward edge is parallel to the longitudinal axes of the bench 11 and workpiece 13 thereon.

A saw adapter plate 89 is pivotably attached to, and abuts on, the forward edge of plate 86 by means of a horizontal hinge 90, having a removable hinge pivot pin 91 (FIGS. 2, 3 & 7). Adapter plate 89 is thus movable, about the pivotal axis of hinge pin 91, toward and away from the workpiece support surface 12. The hinge 90, being secured, as by welding, on the top surfaces of plates 86 and 89, over the joint, limits the angular movement downward of adapter plate 89 to a horizontal position where, at this point, the rearward edge of plate 89 abuts the forward edge of plate 86 and restricts further downward movement (FIG. 2).

The adapter plate 89 is designed to accommodate a conventional portable circular power saw 16 mounted thereon. A flange 92 is welded on the adapter plate 89 along the hinge 90 (FIGS. 6 and 7) and extends the full length of the hinge. In cross-section, flange 92 is curved upwardly and forwardly so as to engage the turned up toe 31 of the planar shoe 27 (FIG. 7). As best illustrated in FIG. 7, the adapter plate 89 extends to approximately half of the length of planar shoe 27 and has an elevated ridge 93 along the edge which aligns along the edge 34 of the planar shoe 27, and another elevated ridge 94, part way along the opposite edge, which aligns along the inside edge 35 of the planar shoe saw blade slot 32 thus preventing lateral and rotational movement of the planar shoe 27 relative to adapter 89. Ridge 94 extends from the forward edge of the adapter plate 89 rearwardly to the extent of the saw blade slot 32, abutting against the end 29 of slot 32 and thus preventing the planar shoe 27 from sliding off the adapter plate 89 (FIG. 7).

An upwardly extending tilting lever 95 is welded to the adapter plate 89, in close proximity to hinge 90, in a position such that its flat face aligns with the inside edge of the guide notch 33 of the planar shoe 27 engaged by adapter plate 89 (FIGS. 2 and 7). One end of a tension spring 96 is attached to the upper end of the lever 95 and the other end is attached to an eye 97 welded to the top surface of arm 73 at rearward end. The tension spring 96 thus acting on lever 95 biases the adapter plate 89, and the saw 16 mounted thereon, angularly upward about the pivotal axis of hinge 90. To limit the degree of this angular upward tilting, a bracket 98 is welded to lever 95, rearwardly disposed, so that its distal end abuts on the diagonal plate 82 at the end of cylinder 76, thus limiting the angular tilting to a suitable degree determined by the length of bracket 98, as best illustrated in FIG. 1.

It is, of course, desirable that the plane of the saw blade 20 should be parallel to the longitudinal axes of the arm 73 and rods 58 which determine the direction that the saw 16 traverses the bench 11 and workpiece 13. Because of the location of the tilt lever 95 with respect to the pivot bolt 87, which is the rotational axis of the plate 86, the tension spring 96 has the tendency to turn plate 86 cooperatively with adapter plate 89, and saw 16 thereon, in a counter-clockwise direction, as viewed from the top (FIG. 3). This rotation is limited to the position where the plane of the saw blade 20 is parallel to the longitudinal axis of arm 73 by a boss 99, provided on plate 86 rearward of the end of hinge 90, which abuts on the forward edge of plate 83 (FIGS. 1 & 2).

The location of the pivotal bore in plate 51, is such that the kerf of the saw blade 20 intersects the junction line of bench sections 14 and 15 at the same point as the vertical axis of pivot bolt 50, regardless of the angle at which the arm 73 is set, and the saw blade 20 always passes through the same notch in fence 15.

In lateral cutting operations the saw 16, the arm 73 and the rods 58 are reciprocated back and forth as a unit. Prior to a cutting operation, the height of the saw blade 20 with respect to the workpiece support surface 12 should be adjusted, if necessary, by loosening lock nut 72 and moving the support column 69, upwardly or downwardly in the channel 68, to a position such that the saw blade 20 just barely contacts the surface 12 when the saw 16 is fully lowered with the adapter plate 89 in a horizontal position. The lock nut 72 is then tightened, rigidly securing column 69. Properly adjusted and operated in this position, the saw blade should cut a fine, shallow kerf in the surface 12 of bench 11 and a blade notch in fence 15, passing partly into the fence at the limit of the rearward movement of the saw 16.

It should be pointed out, however, that frequent depth adjustments by means of support column 69 are unnecessary with this cutting apparatus since the saw 16 is tiltable upwardly and may be brought forwardly above the workpiece. Once the correct blade depth setting has been established, as described above, column 69 may remain locked in that position for the duration of all subsequent cutting operation with that particular saw blade and make and model of saw. If a shallow cut is desired, i.e., a cut not through the full thickness of the workpiece, the saw blade 20 may be raised, temporarily, on the saw 16 itself by means of the cutting depth adjusting knob 26 (FIGS. 1 and 7).

It is necessary for the lower saw blade guard 22 to be moved upwardly, thus exposing the saw blade 20, when the saw 16 is moved downwardly into a cut. It is also desirable, for safety purposes, to have the guard 22 move back around the saw blade when the saw is tilted upwardly. For this purpose, a chain linkage 100, of a suitable length, is provided between the guard operating lever 23, where it is detachably secured by means of a hook, and the eye 97 on arm 73. When the saw 16 is moved downwardly in an arc about hinge pin 91, its distance from the eye 97 increases, and the chain linkage 100, acting on lever 23, causes the guard 22 to move upwardly. When the saw 16 is tilted upwardly again, the biasing spring, incorporated in the saw assembly, urges the guard 22 back around the saw blade 20 as the distance to the eye 97 decreases.

To set the apparatus 10 at a desired lateral cutting angle with respect to the longitudinal axis of a workpiece 13, the lock knob 53 (FIG. 5) is loosened, the locating pin 66 is pulled upwardly against the spring bias and the arm 73 is rotated about the pivot bolt 50 to the desired angle indicated on the scale 39 by indicator 65. The lock knob 53 is then tightened to lock the arm 73 in that position. If the cutting angle is 90 degrees, or 45 degrees right or left, the spring biased locating pin 66 will snap into apertures provided at these positions in plate 51.

To execute a lateral vertical cut on a workpiece 13, the saw 16, with the arm 73 set at the desired cutting angle as described above, is moved to the full extent rearwardly in a tilted-up position, as best illustrated in FIG. 1. This leaves the surface 12 unobstructed and clearly visible for placing and positioning of the workpiece 13 abutting against the fence 15. The saw 16 is then drawn, with one hand, by the handle 17, in the tilted-up position, forwardly over the workpiece 13 while the other hand is used to hold the workpiece in place. When the saw blade 20 is directly above the forward edge of the workpiece 13, the trigger switch 18 is pulled on and the saw 16 is then plunged downwardly to the full extent and pushed rearwardly to complete the cut, as best illustrated in FIGS. 2 and 3. When the saw blade 20 has passed clearly through the workpiece 13, the trigger switch 18 is released, the downward force on the handle 17 is eased and the tension spring 96 then returns the saw 16 to the tilted-up position leaving the work area unobstructed for the removal or repositioning of the workpiece.

Because of the novel design of the adapter plate 89, the weight of the saw 16 and any downward force applied to the handle 17, against the upwardly biasing force of the spring 96, lock the saw securely on the adapter plate 89 by the engagement of the planar shoe 27 as previously described. The saw 16 may be removed from the adapter plate 89 only by tilting it forwardly, about the toe 31 of the planar shoe 27, a sufficient amount for the end 29 of the saw blade slot 32 to rise above the ridge 94. The toe 31 may then be eased out from under the flange 92 and the saw lifted off.

For reasons to be pointed out further on in this description, it is, at times, necessary to secure the saw 16 to the adapter plate 89 by means of screws. For this purpose, screw holes 57, having beveled edges on the underside, are provided in the adapter plate 89 which correspond to, and align with, the mounting screw holes in the planar shoe 27 and the internally threaded screw holes in the planar shoe mounting bracket 28, as best illustrated in FIG. 7. Thus the planar shoe 27 may be removed from the saw 16 and the attaching screws 30 may then be used to secure the adapter plate 89 directly to the mounting bracket 28 on the saw 16 through the holes 57. It is also possible, if desired, to secure the saw 16 to the adapter plate 89 with the planar shoe 27 in place by the use of longer screws of the same type as the screws 30.

To execute a bevel cut, i.e., a cut diagonal to the surface 12, it is desirable to first remove the planar shoe 27 from the saw 16, as described above, since it interferes with the top surface of the workpiece and with the fence 15 when the saw is set at a bevel cutting angle. With the saw 16 thus secured by screws 30 directly to the adapter plate 89, the collar bearing tightening screw 75 is loosened and the inner cylinder 76, with the attached saw, is rotated within the concentric cylindrical arm 73 to the desired bevel angle, as indicated on the angle graduations 80 by the indicator 81, and then the screw 75 is tightened again. This rotation moves the pivotal axis of the hinge 90 angularly clockwise (viewed rearwardly) from the horizontal position and hence the plane of the saw blade 20 is tilted accordingly from the vertical position. A bevel cut and a compound cut (a bevel and a miter cut) may then be executed by the same procedure as previously outlined for a lateral vertical cut.

It should be noted that the maximum bevel cutting angle of 45 degrees is predetermined by the projection 78 abutting against the end of the cutout 79, and that during a bevel angle adjustment, as described above, the tension spring 96 pulling on the lever 95 holds the collar 77 against collar bearing 74.

The apparatus 10 of this invention incorporates a novel feature for the execution of rip cuts, i.e., cuts parallel to the longitudinal axis of an elongated workpiece. For this type of cutting it is necessary to secure the saw 16 to the adapter plate 89, by means of screws as previously described, either with or without the planar shoe 27 in place. With the arm 73 locked in the 90 degree position and with the saw 16 moved partly forwardly to the middle of the surface 12, the set screw 64 is tightened securing the rods 58 and arm 73 from movement. The lock knob 88 is loosened and the adapter plate 89 and saw 16, in conjunction with plate 86, are rotated, about pivot bolt 87, through almost 90 degrees.

The saw and adapter plate are then eased fully downward to a horizontal position and rotated further to the full extent of 90 degrees. In this position the ridge 93 is aligned along the forward edge of the projecting ear 84 and the top of the ridge 93 snaps underneath the flange 85 and is held against it in this horizontal position by the tension of spring 96 acting on lever 95, now on the other side of pivot bolt 87, as illustrated in FIG. 4. Lock knob 88 is then tightened to secure plate 86. In this position the plane of the saw blade 20 is perpendicular to the longitudinal axis of the arm 73 and parallel to the fence 15 which may now serve as a rip fence for sliding the workpiece therealong. The saw blade 20 may now be adjusted to the desired distance from the rip fence 15 by loosening the set screw 64 and moving the saw 16 toward or away from the fence 15 as necessary. It may be desirable during this adjustment to raise the saw blade 20 slightly above the bench surface 12 to prevent snagging. This may be accomplished either by means of the blade depth adjusting knob 26 on the saw itself or by loosening the screw 75 and raising the saw slightly thus rotating the inner cylinder 76 in the collar bearing 74. Once the desired distance from the rip fence 15 has been located, as by a measuring tape, the saw is locked in that location by tightening set screw 64. The saw 16 may then be lowered with the power on so that the blade 20 cuts a shallow kerf in the surface 12 of the bench 11 and then the screw 75 is tightened firmly to secure the saw in the horizontal position. A workpiece 13 is then ripped by feeding it to the saw 16 along fence 15. For bevel rip cuts the saw 16 may be set at a desired bevel angle by the bevel angle adjusting knob 24 on the saw itself.

Although all conventional portable circular power saws have basically the same typical features, the planar shoes of saws produced by different manufacturers may vary in size and shape while retaining the basic typical features of a turned up toe 31, saw blade slot 32, and guide notch 33. It is therefore necessary to have a separate, specific, adapter plate 89 for each different make and model of saw to be utilized by the apparatus 10. However, other than minor changes in the dimensions and shape, such basic features as the flange 92 and the ridges 93 and 94 are common to all such adapter plates. Furthermore, the hinge 90, the tilting lever 95 and all the basic functions are identical for each such plate so that any adapter plate 89 may be detached from the apparatus 10 by removing hinge pin 91 and replaced by one that accommodates the type of saw to be utilized.

The adapter plate 89 may, of course, be modified to act as a saw support member for accommodating a circular power saw other than the conventional portable type herein described. Thus, if desired, a suitable motor powered circular saw may, with the addition of a handle, a switch, a saw blade guard, and if necessary, a mounting bracket, be utilized by the apparatus embodying this invention.

As has been pointed out in the foregoing description, the apparatus 10, the preferred embodiment of this invention, offers substantial improvements over the prior art devices. It will be observed, however, that numerous variations and modifications may be effected without departing from the true spirit and scope of the novel concept of this invention. It is to be understood that no limitation with respect to the specific apparatus illustrated herein is intended or should be inferred.

The embodiments of the invention in which an exclusive property or privilege is claimed are defined as follows:

1. A portable sawing device which utilizes a circular power saw and which is adapted to be detachably secured to a workpiece support bench constructed of wood and consisting of an extended, flat, broad, horizontal section defining a workpiece support surface, and a similarly extended, narrow, flange section secured along the rearward edge thereof, defining a workpiece abutting or rip fence, said portable sawing device comprising:

a frame comprising a plurality of frame members;

frame attaching means for detachably securing the frame against the underside of the workpiece support bench;

a saw supporting arm, cantilvered forwardly and horizontally over the workpiece support bench from a vertical support column upwardly disposed behind the bench;

a saw support member for supporting a power saw thereon;

means for engaging a power saw on the saw support member;

means for securing a power saw to the saw support member;

pivotal attaching means, for attaching the saw support member to a bearing means at the forward part of the saw supporting arm, permitting the pivotal movement of the saw support member with a power saw thereon about a substantially horizontal axis between a fully lowered cutting position generally spaced from and parallel to the workpiece support surface and a raised, non-cutting, tilted-up position above the workpiece support surface to allow placement, positioning, and removal of a workpiece;

means for upwardly biasing the saw support member with a power saw thereon to the raised, non-cutting position;

slidable carriage means carrying the vertical support column and slidably mounted below the frame by means permitting horizontal back and forth movement whereby a power saw supported on the saw support member may be reciprocated in conjunction with the saw supporting arm to traverse a workpiece supported on the workpiece support bench to effect a cut on the workpiece;

means for adjustably and rigidly securing the vertical support column to the slidable carriage means permitting upward and downward adjustment of the support column;

carriage mounting means slidably receiving the carriage means and pivotally attached to the underside of the frame permitting the horizontal rotational movement of the carriage means about a vertical axis whereby the saw supporting arm may be aligned at various lateral cutting angles to the longitudinal axis of the workpiece support bench and, by means provided, locked in fixed relation to the frame at desired lateral cutting angles;

means for determining desired lateral cutting angles;

means for quickly locating selected lateral cutting angles;

means for releasably locking the slidable carriage means in fixed relation to the carriage mounting means;

bearing means, attached to the forward part of the saw supporting arm and bearing the pivotal attaching means of the saw support member, permitting the rotational movement of the attached saw support member and a power saw thereon about a vertical axis from a lateral cutting position parallel to the longitudinal axis of the saw supporting arm to a rip cutting position perpendicular to the longitudinal axis of the saw supporting arm;

means for restraining the saw support member and a power saw thereon in the fully lowered cutting position when in the rip cutting position;

means for releasably locking the bearing means in fixed relation to the saw supporting arm when in the lateral cutting position and when in the rip cutting position;

means for permitting the rotation of the bearing means about a horizontal axis parallel to the longitudinal axis of the saw supporting arm whereby the horizontal pivotal axis of the pivotal attaching means of the saw support member may be rotated from the horizontal position and the plane of the saw blade tilted from a vertical cutting position to bevel angle cutting positions;

means for determining desired bevel cutting angles;

means for releasably locking the bearing means at the vertical and rotated bevel angle cutting positions; and means for limiting the extent of rotation of the bearing means about the horizontal axis parallel to the longitudinal axis of the saw supporting arm.

2. A sawing device as defined in claim 1 wherein the frame and the frame attaching means comprise:

a flat frame member for conforming flatly against the underside of the workpiece support bench;

an extended flange member, secured across the rearward part of the flat frame member, for aligning with and conforming to the lower rearward edge of the workpiece support bench;

a pair of attaching brackets, one secured at each end of the extended flange frame member, upwardly disposed, having forwardly turned top parts with tightening means for releasably attaching this part of the frame to the fence section of the workpiece support bench;

an extension bracket, forwardly disposed and extendably attached to the forward part of the flat frame member, having a turned-up forward part with tightening means for releasably attaching this part of the frame to the forward edge of the workpiece support bench; and a part of the flat frame member extending rearwardly beyond the extended flange frame member and having an arcuate edge with angle indicia thereon.

3. A sawing device as defined in claim 1 wherein the slidable carriage means comprises:

a pair of rods, horizontally extended, equal length, parallel, and spaced apart, slidable mounted below the frame and laterally disposed relative to the longitudinal axis of the workpiece support bench;

front and rear cross members extending transversely between the ends of the rods and secured rigidly thereto; and a vertical channel in the rear cross member for slidably and snugly receiving the lower end of the vertical support column secured rigidly therein by means permitting upward and downward adjustment.

4. A sawing device as defined in claim 3 wherein the carriage mounting means comprises:

a flat mounting member rotatably and flatly mounted against the frame underside on a vertical pivot projecting downwardly from the frame and, by means provided, lockable thereto in various rotatably adjusted positions;

a pair of sleeves, parallel, spaced apart, and shorter than the rods, secured on mounting means along the opposite sides of the flat mounting member;

friction reducing means internally fitted into each of the ends of the sleeves and slidably receiving the rods; and tightening means for releasably securing the rods in fixed relation to the sleeves.

5. A sawing device as defined in claim 1 wherein the saw supporting arm comprises:

two concentric telescoped cylinders, the outer cylinder secured to the top of the vertical support column and cantilevered forwardly; the inner cylinder rotatable within the outer cylinder, extending forwardly beyond it and having the bearing means secured to its forward end;

a split collar bearing formed at the forward end of the outer cylinder with tightening means for releasably securing the inner cylinder from rotation;

means limiting the extent of inner cylinder rotation; and means indicating the degrees of inner cylinder rotation.

6. A sawing device as defined in claim 1 wherein the bearing means at the forward part of the saw supporting arm comprises:

a fixed bearing plate secured to the underside of the forward part of the saw supporting arm;

a companion bearing plate rotatably attached by pivotal means face to face beneath the fixed bearing plate and releasably lockable in fixed relation thereto; and a bracket projecting from the fixed bearing plate with means for restraining the saw support member and a power saw thereon in the fully lowered cutting position when in the rip cutting position.

7. A sawing device as defined in claim 1 wherein the circular power saw is of the conventional portable type having a planar shoe, and the saw support member comprises:

a flat member conforming flatly against the underside of planar shoe;

planar shoe engagement means for securing the planar shoe from sliding and rotational movement relative to the plane of the flat member and for permitting the removal of the planar shoe from the flat member; and means for securing the portable power saw to the flat member with the planar shoe removed from the saw.

8. A sawing device as defined in claim 7 wherein the planar shoe engagement means permits the removal of the portable power saw only by upward and forward tilted of the saw about the toe of the planar shoe and comprises:

an upwardly and forwardly disposed flange extending along the rearward part of the flat member for aligning along and engaging the toe of the planar shoe;

a flange extending along the side edge of the flat member and projecting above the top surface of the flat member to align with the side edge of the planar shoe; and a second flange extending along the opposite side edge of the flat member and projecting above the top surface of the flat member to align with the inside edge, and abut with the end, of the saw blade slot in the planar shoe.

9. A sawing device as defined in claim 1 wherein the pivotal attaching means of the saw support member is a hinge consisting of a plurality of cylinders arranged end to end and alternately secured to the saw support member and the bearing means and with a hinge pin passing therethrough.

10. A sawing device as defined in claim 1 wherein the means upwardly biasing the saw support member comprises:

a bracket extending upwardly from the pivotal end of the saw support member; and a tension spring, one end of which is carried by the upper end of the bracket and the other end of which is carried by means on the saw supporting arm.

* * * * *